(12) United States Patent
Ralls et al.

(10) Patent No.: US 11,224,935 B2
(45) Date of Patent: Jan. 18, 2022

(54) SYSTEM AND METHOD FOR ULTRASONIC ADDITIVE MANUFACTURING

(71) Applicant: Huntington Ingalls Incorporated, Newport News, VA (US)

(72) Inventors: John Walter Ralls, Yorktown, VA (US); Daniel John Hebert, Carrollton, VA (US); Kyle A. Wade, Poquoson, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 381 days.

(21) Appl. No.: 16/421,727

(22) Filed: May 24, 2019

(65) Prior Publication Data

US 2019/0375042 A1    Dec. 12, 2019

Related U.S. Application Data

(60) Provisional application No. 62/683,793, filed on Jun. 12, 2018.

(51) Int. Cl.
*B23K 20/10* (2006.01)
*B33Y 10/00* (2015.01)
*B33Y 30/00* (2015.01)
*B23K 37/02* (2006.01)
*B33Y 50/02* (2015.01)

(52) U.S. Cl.
CPC .......... *B23K 20/10* (2013.01); *B23K 37/0211* (2013.01); *B23K 37/0258* (2013.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | | |
|---|---|---|---|---|
| 3,217,957 A | * | 11/1965 | Jarvie | B23K 20/103 228/1.1 |
| 4,283,617 A | * | 8/1981 | Merrick | B23K 9/0286 219/125.1 |
| 4,975,133 A | * | 12/1990 | Gochermann | B23K 20/103 156/580.2 |
| 5,227,601 A | * | 7/1993 | Black | B23K 9/12 219/124.33 |

(Continued)

*Primary Examiner* — Devang R Patel
(74) *Attorney, Agent, or Firm* — Hunton Andrews Kurth LLP

(57) ABSTRACT

A welding apparatus has a guide rail arrangement with at least one guide rail attachable to a welding target. A carriage has a carriage housing and a rail follower assembly that is movably mountable to the guide rail arrangement for relative movement along the at least one guide rail. A feedstock source is disposed within the carriage housing and configured to deposit a feedstock material on a target surface of the welding target. An ultrasonic weld head is partially disposed within the carriage housing and has a sonotrode that extends toward the target surface so as to engage the deposited feedstock material and apply a normal welding force to the deposited feedstock material and the target surface. The sonotrode is operable to conduct ultrasonic vibrations into the deposited feedstock material and the target surface to weld the feedstock material to the target surface.

20 Claims, 15 Drawing Sheets

(56) References Cited

U.S. PATENT DOCUMENTS

| | | | | |
|---|---|---|---|---|
| 5,947,364 | A | * | 9/1999 | Tamura ................ B23K 20/106 228/1.1 |
| 5,981,906 | A | * | 11/1999 | Parker .................. B23K 9/0286 219/137 PS |
| 7,028,882 | B2 | * | 4/2006 | Kislovsky .............. B23K 9/126 219/59.1 |
| 7,748,592 | B2 | * | 7/2010 | Koga ................ B23K 37/0294 228/2.1 |
| 8,310,324 | B2 | * | 11/2012 | Harris ................... B23K 31/02 335/285 |
| 9,321,118 | B2 | * | 4/2016 | Dagenais ............. B23K 9/1735 |
| 9,358,642 | B2 | * | 6/2016 | Pacchione ........... B23K 20/122 |
| 9,446,475 | B2 | | 9/2016 | Norfolk et al. |
| 9,776,272 | B2 | * | 10/2017 | Einav .................... B23Q 3/005 |
| 10,421,104 | B1 | * | 9/2019 | Newmeister .............. B08B 1/04 |
| 2002/0019683 | A1 | * | 2/2002 | White ................... B33Y 50/02 700/255 |
| 2009/0026661 | A1 | * | 1/2009 | Sturman ............ B23K 26/0823 264/400 |
| 2009/0057373 | A1 | * | 3/2009 | Darzi .................... B23K 37/08 228/18 |
| 2010/0213244 | A1 | * | 8/2010 | Miryekta ........... B23K 37/0229 228/112.1 |

* cited by examiner

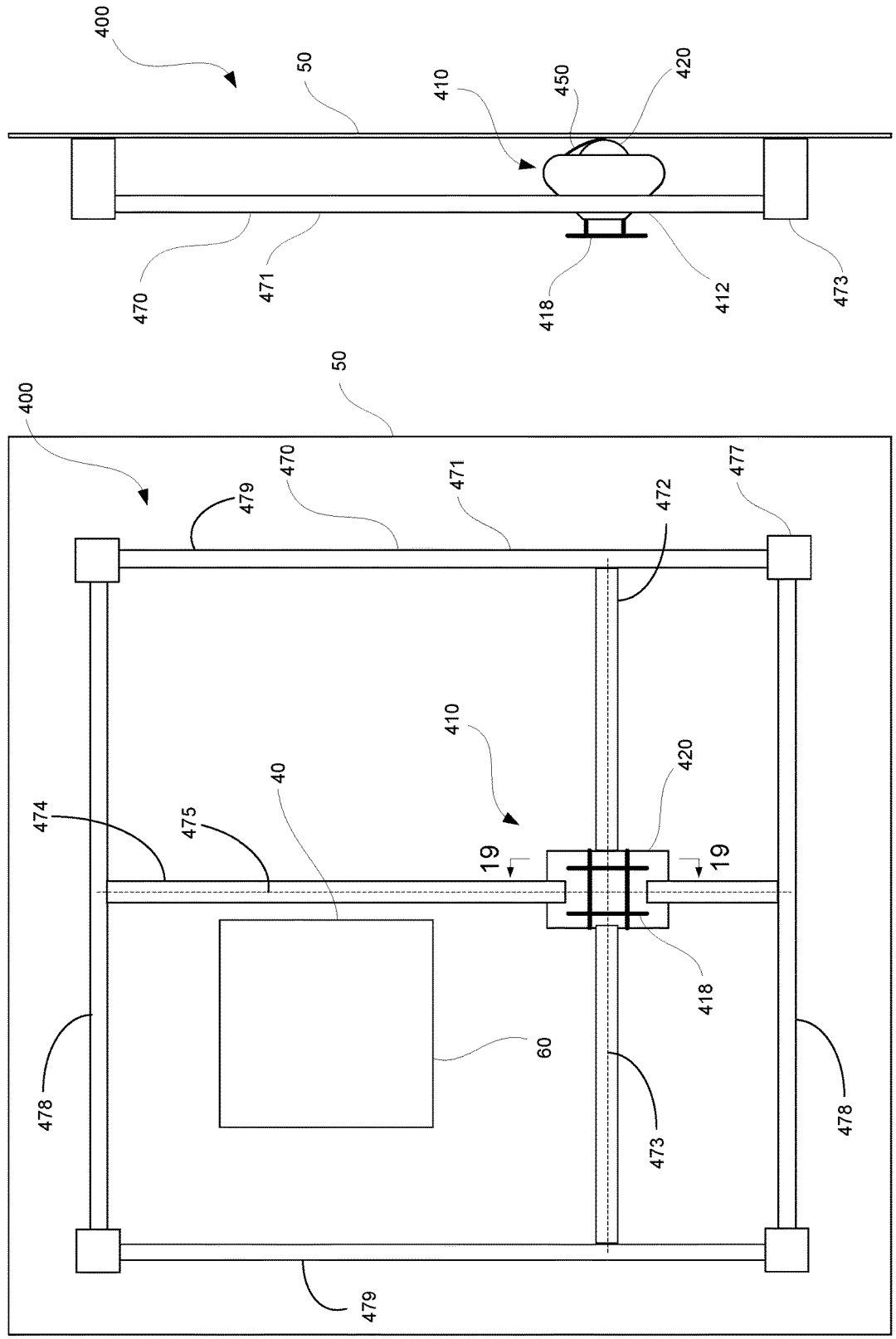

SYSTEM AND METHOD FOR ULTRASONIC ADDITIVE MANUFACTURING

This application claims priority to U.S. Provisional Application No. 62/683,793, filed Jun. 12, 2018, the complete disclosure of which is incorporated herein in its entirety.

BACKGROUND OF THE INVENTION

This application relates generally to ultrasonic additive manufacturing (UAM) methods and, more particularly, to the use of ultrasonic AM in a portable device for in-place repair or joining of components.

Additive manufacturing (AM) is the term given to manufacturing processes in which component features are formed through the sequential application of thin, substantially two-dimensional layers. Each layer is made at a specified thickness and many layers are formed in a sequence with the two dimensional layer shape varying from layer to layer to achieve a desired three-dimensional component structure.

In UAM, solid metal objects are formed by ultrasonically welding successive layers of thin metal tape into a three-dimensional weld. The tape layers are held to a substrate under pressure and high-frequency (typically 20,000 hertz) ultrasonic vibrations are applied using a sonotrode to produce a solid-state weld between the tape and the substrate and/or between tape layers. Machining operations (i.e., subtractive manufacturing processes) may be applied during or after UAM operations to provide particular features to the component.

SUMMARY OF THE INVENTION

An illustrative aspect of the invention provides a welding apparatus comprising a guide rail arrangement attachable to a welding target. The guide rail arrangement includes at least one guide rail having an upper surface and a lower surface and a plurality of supports attached to the at least one guide rail for maintaining each of the at least one guide rail at a uniform distance from a surface of the welding target. The welding apparatus further comprises a carriage comprising a carriage housing and a rail follower assembly. The rail follower assembly is attached to the carriage housing and is movably mountable to the at least one guide rail for relative movement there-along. The rail follower assembly is in engagement with both the upper and lower rail surfaces of each of the at least one guide rail when mounted thereto. The apparatus still further comprises a feedstock source disposed within the carriage housing and configured to selectively deposit a feedstock material on a target surface of the welding target when the welding apparatus is in a welding configuration in which the undercarriage is attached to the at least one guide rail and the guide rail arrangement is attached to the welding target. The apparatus also comprises an ultrasonic weld head partially disposed within the carriage housing and having a sonotrode extending toward the target surface when the welding apparatus is in the welding configuration so as to engage the deposited feedstock material and apply a normal welding force to the deposited feedstock material and the target surface. The sonotrode is operable to conduct ultrasonic vibrations into the deposited feedstock material and the target surface to weld the feedstock material to the target surface.

Another illustrative aspect of the invention provides a method of applying a weld to a welding target. The method comprises attaching a guide rail arrangement to the welding target. The guide rail arrangement includes at least one guide rail. the method further comprises movably mounting a weld head carriage to the guide rail arrangement. The weld head carriage comprises a carriage housing, a rail follower assembly, a feedstock source and an ultrasonic weld head. The rail follower assembly is placed in engagement with each of the at least one guide rail for movement there-along. The method still further comprises positioning the weld head carriage at a starting position adjacent a target surface of the welding target and initiating relative movement between the weld head carriage and the guide rail arrangement. The method also comprises depositing feedstock material from the feedstock source on the target surface of the welding target and engaging the deposited feedstock material with the sonotrode, thereby applying a normal welding force to the deposited feedstock material and the welding target. The method also comprises conducting ultrasonic vibrations into the deposited feedstock material and the welding target, thereby welding the deposited feedstock material to the target surface and adding a welded feedstock layer to the welding target. In certain embodiments, the method includes repeating the actions of positioning, initiating, depositing, engaging, and conducting to add additional welded feedstock layers to the welding target.

BRIEF DESCRIPTION OF THE DRAWINGS

The invention can be more fully understood by reading the following detailed description together with the accompanying drawings, in which like reference indicators are used to designate like elements, and in which:

FIG. 17 is a plan view of a welding apparatus according to an embodiment of the invention;

FIG. 18 is a side view of the welding apparatus of FIG. 17;

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides methods and apparatus for joining or repairing components using a portable welding assembly that includes a material deposition apparatus and a sonotrode or similar energy input device. In general, the methods of the invention allow the use of UAM in operations in which a desired relative motion is established and maintained between the material deposition and welding apparatus and the target component(s) being assembled or repaired. The relative motion may be an orbital rotation (e.g., for repairing or joining pipe sections) or may be translational (e.g., parallel to, orthogonal to, or otherwise angled relative to a surface of the target component(s)). The relative motion may be established by holding the target component or components fixed and moving the material deposition and welding apparatus (e.g., rotationally around an axis or translationally along the surface of the target component(s). Alternatively, the material deposition and welding apparatus may be fixed and the target component(s) translated or revolved.

Accordingly, in some embodiments, the welding assembly is housed in a carriage configured to move along a guided track system (orbital or planar) or to be moved within a planar framework, the track or framework being temporarily or permanently attached to the welding target. In other embodiments, the welding assembly is part of an assembly configured to grasp and hold the component(s) in engagement with the welding assembly and to translate or rotate the component(s) relative to the welding assembly.

Illustrative embodiments of the invention are described in more detail in the following paragraphs.

Figure 1:
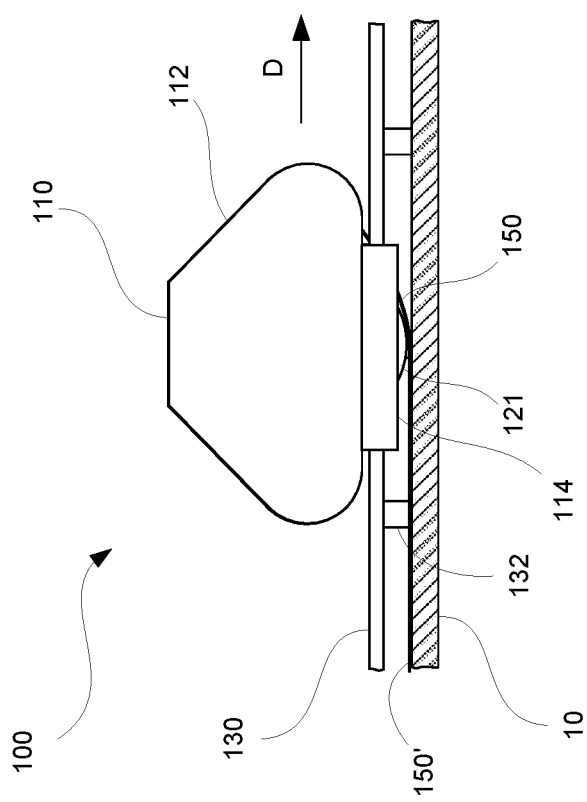
FIG. 1 is a side view of a welding apparatus according to an embodiment of the invention.
Figure 2:
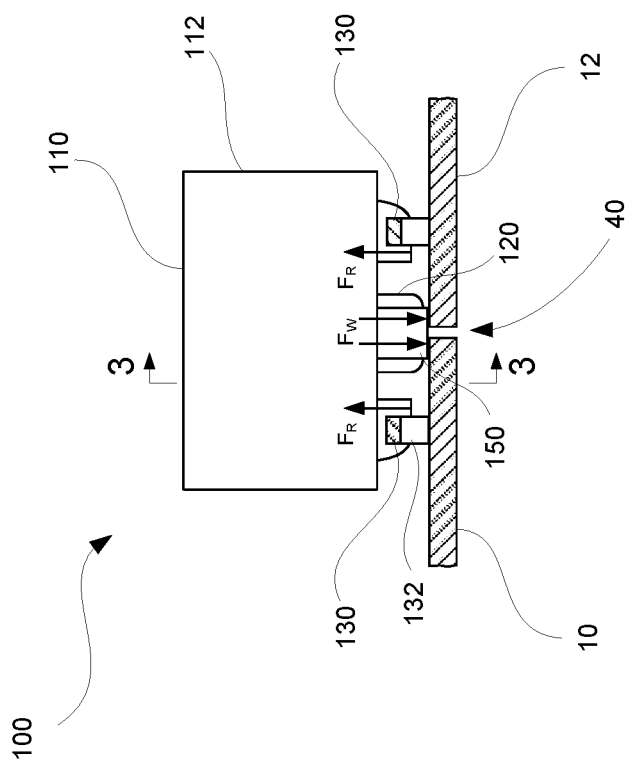
FIG. 2 is a front view of the welding apparatus of FIG. 1.
Figure 3:
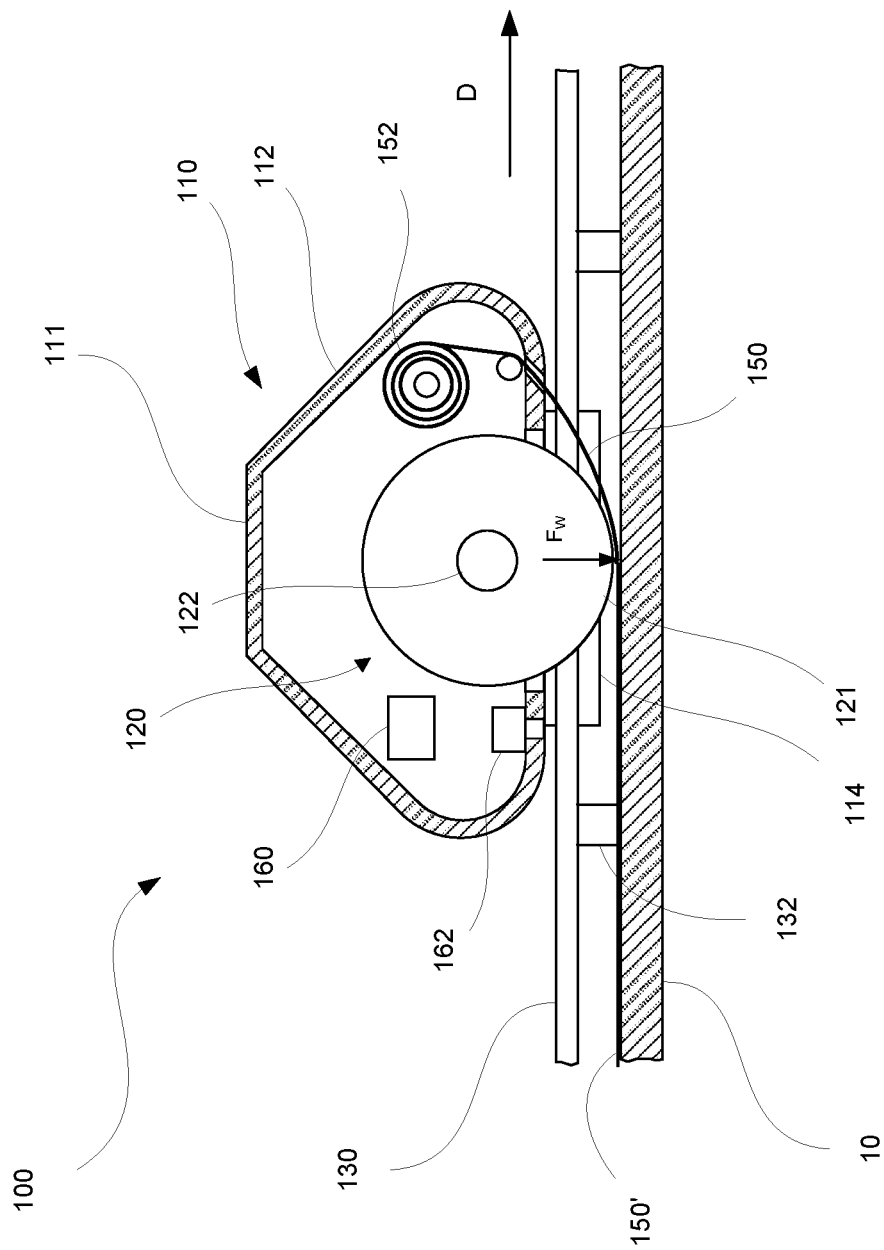
FIG. 3 is a section view of the welding apparatus of FIG. 1.

FIGS. 1-3 depict a UAM apparatus 100 according to an embodiment of the invention. The UAM apparatus 100 is usable for ultrasonic, in-situ welding for repair or construction of a fixed structure (welding target). In the illustrative application of FIG. 1-3, the structure consists of two plates 10, 12 which are to be welded together along a joint line 40. (It will be understood that the structure could also be a single plate with two portions 10, 12 separated by a crack or flaw 40 requiring repair.) The material of the welding target structure (substrate material) may be any metallic material that can be ultrasonically welded. Typical substrate materials would include both ferrous and non-ferrous alloys such as steel, stainless steel alloys, aluminum, copper-based alloys, nickel-based alloys, and other families of alloys. The UAM apparatus 100 comprises a material deposition and welding carriage 110 and a pair of parallel guide rails 130. Each guide rail 130 may be a continuous rail member or may be a plurality of rails segments joined together. In some embodiments, the guide rails 130 may be flexible in order to allow them to follow the contour of a non-planar welding target surface. The guide rails 130 are each supported by a plurality of rail supports 132 which may be temporarily or permanently attached to the structure to be welded. The attachment mechanism need only be sufficient to counter the forces applied to the structure during the welding operation. Suitable mechanisms may include, without limitation, welding, reversible or permanent chemical or thermal bonding, hydraulics, mechanical fasteners (e.g., screws, bolts, clamps, etc.), and magnets. The supports 132 are mounted so that the guide rails 130 are positioned on opposite sides of a line along which the structure is to be welded. In the illustrated example, the rails 132 are mounted along opposite sides of the joint line 40.

While the illustrated embodiment shows a guide rail arrangement having two rails, it will be understood that some embodiments of the invention may use only a single rail (monorail) arrangement. Other embodiments could make use of guide rail arrangements having more than two rails.

While the illustrated example of this embodiment shows the guide rails 130 mounted to a planar surface, they may also be mounted to curved surfaces. For example, the guide rails 130 could be mounted to the outside of a pipe on a line parallel to the pipe centerline.

With reference, in particular, to FIG. 3, the material deposition and welding carriage 110 comprises a carriage housing 112 in which is disposed a weld head 120 comprising a sonotrode 121 and a reel or other source 152 of weldable feedstock 150. The weldable feedstock 150 will typically be in the form of a thin tape that can be drawn from the source 152 and will typically be of a similar metal alloy to the substrate(s) to which it is to be applied. Accordingly, typical feedstock materials include a stainless steel alloys, aluminum alloys, copper-based alloys, nickel-based alloys, and other non-ferrous and ferrous alloys capable of being ultrasonically welded. While the feedstock material is typically similar to the substrate material, dissimilar feedstock metals may also be used for some applications. The carriage housing 112 is mounted to a rail follower assembly in the form of an undercarriage 114 configured to engage the guide rails 130. The undercarriage 114 is further configured so that the carriage 110 is movable along the guide rails 130 and so that it provides a reactive retaining force $F_R$ that holds the undercarriage 114 in engagement with the guide rails 130 in response to the application of a welding force $F_w$ to the structure being welded. In some embodiments, the guide rails 130 may be configured to provide a lower surface that can be engaged by the undercarriage 114 for transmission of the reactive retaining force $F_R$. The undercarriage 114 may include wheels or bearings configured to facilitate the motion of the carriage 110 along the rails 130.

The carriage 110 is configured so that as it moves along the guide rails 130 in the direction D, feedstock 150 is drawn from the feedstock source 152 to pass between the sonotrode 121 and the surface of the structure to be welded. The weld head 120 is mounted so as to allow application of the welding force $F_W$ to the feedstock 150 and the structure surface. In some embodiments and applications, the weight of the device may provide a sufficient force. In other embodiments, internal or external electrical, mechanical or electromechanical mechanisms can be used to apply or contribute to the welding force $F_W$. A simple example of an internal mechanical mechanism would be a screw mounted to the carriage body 112 that turns to provide downward force on the weld head 120 and the sonotrode 121.

At the same time the welding force $F_W$ is being applied to the feedstock 150, the sonotrode transducer 122 is energized to produce high frequency vibration to weld the feedstock 150 to the structure (in this case, to the surfaces of the two plates 10, 12). In the illustrated example, the welded feedstock layer 150' bridges the joint line 40 and serves as a first layer of a UT weld to permanently join the two plates 10, 12. It will be understood that after application of this first layer of welded feedstock 150', the carriage 110 may be returned to its starting point to apply a subsequent layer 150'. The process may be repeated as many times as necessary to produce the desired weld.

The material deposition and welding carriage 110 may also comprise an on-board data processor 160 in communication with the sonotrode transducer 122 and feedstock dispensing mechanism. The processor 160 may also be in communication with external processors or user input devices. In some embodiments, this may be by wireless connection via a network. The processor 160 may also be in communication with an internal or external power source connected to the sonotrode transducer 122. In alternative embodiments, control of the material deposition and welding carriage 110 may be accomplished via other means such as from an alternate location, via wireless controls (e.g., from an alternate location) or via some other local device able to communicate with the carriage 110.

The apparatus 122 may also include a sensor package 162 mounted to the carriage housing 112. The sensor package 162 may be in communication with the data processor 160 and could include, for example, optical, laser, thermal or other sensors configured and positioned to capture data on the applied feedstock 150'. The captured data may be analyzed to assess the integrity of the welded layer 150'.

Figure 5:
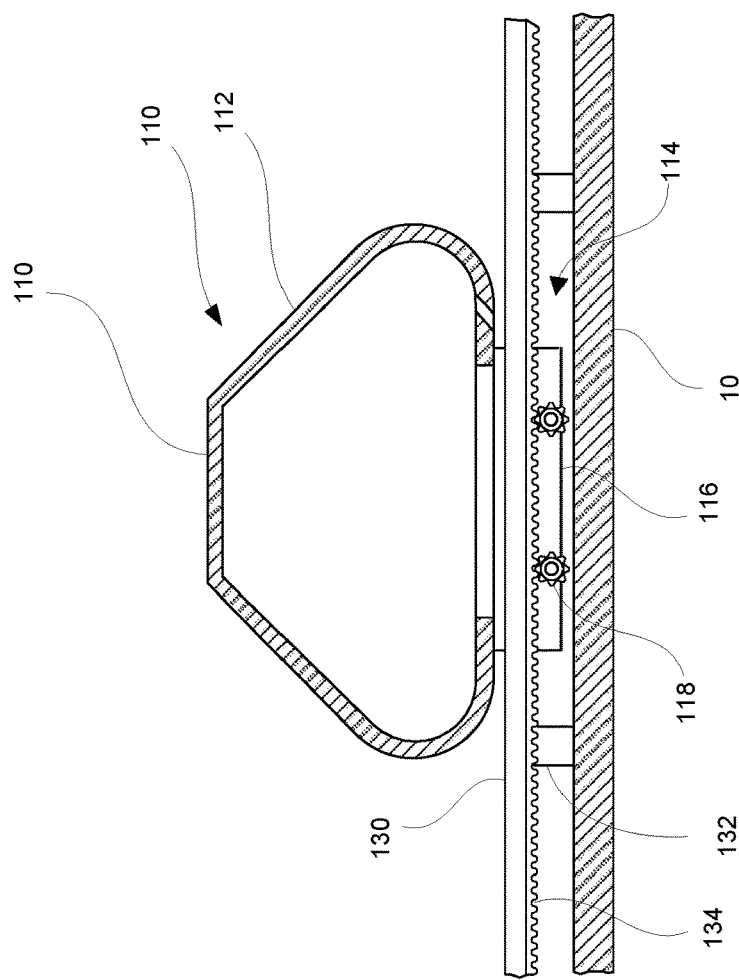
FIG. 5 is a section view of the welding apparatus of FIG. 4 with internal features removed for simplicity.
Figure 4:
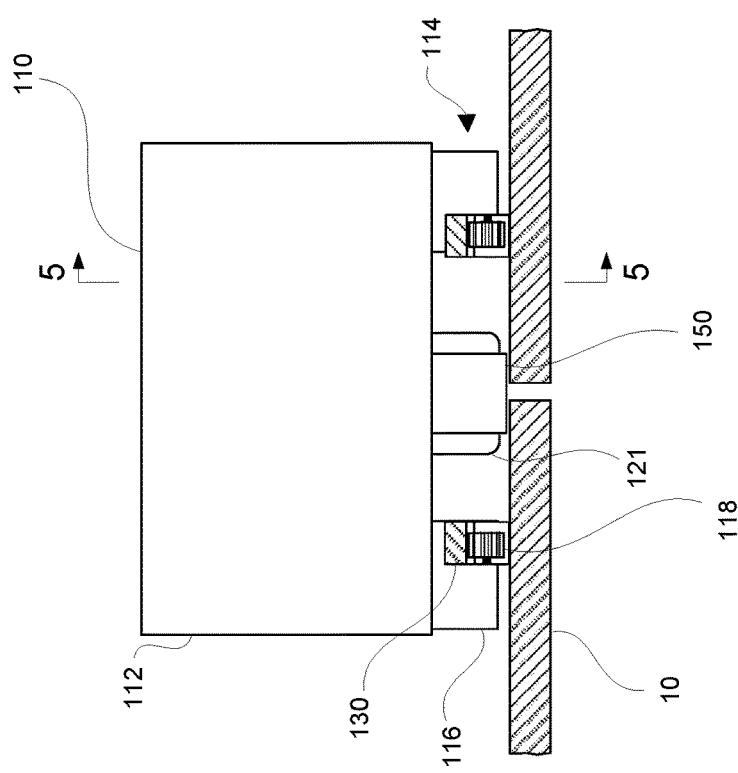
FIG. 4 is a front view of the welding apparatus according to an embodiment of the invention.
Figure 6:
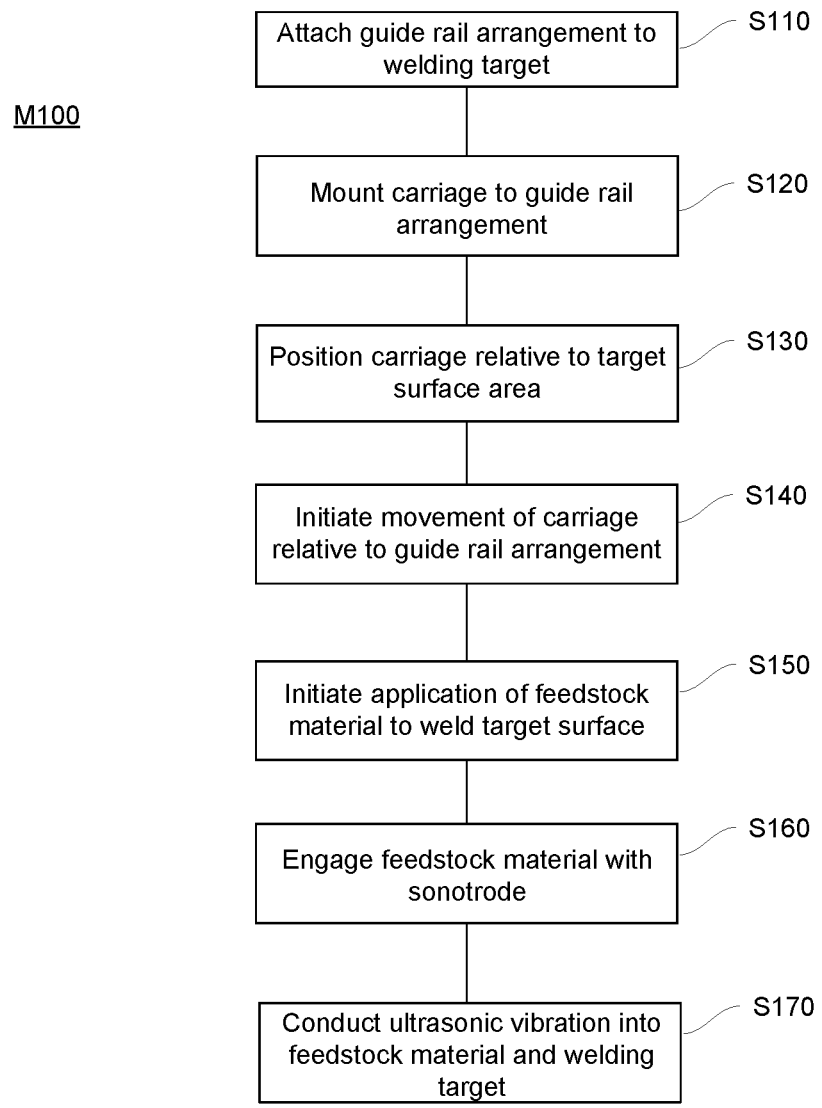
FIG. 6 is a flow diagram of a method of forming a weld according to an embodiment of the invention.

In favored embodiments of the invention the deposition and welding of feedstock material is coincident with movement of the weld head carriage relative to the welding target area of the target structure. In some embodiments, this movement is provided and controlled manually by a user of the apparatus. In other embodiments, the carriage may be self-propelled or propelled by a drive system incorporated into the guide rail arrangement. FIGS. 4 and 5 illustrate a simple variation of the previously described UAM apparatus 100 in which the undercarriage 114 of the carriage 110 includes a drive mechanism. The drive mechanism in this case is a plurality of gears 118 driven by one or more motors (not shown) within a motor housing 116. The gears 118 are configured to engage a rack 134 attached to the underside of each rail 130. Revolution of the gears 118 causes the carriage 110 to be propelled along the rails 130. Any suitable self-propulsion mechanism may be used and may be controlled remotely or by the on-board processor 160. Alternatively, a manual drive mechanism may be operatively connected to the drive mechanism With reference to FIG. 6, a generalized method of applying a weld using the UAM apparatus 100 or apparatus according to other embodiments of the invention includes attaching the guide rail arrangement to the welding target at S110. The welding target may be a single metal object to an area of which a weld is to be applied or the welding target may be a plurality of objects to be joined together. In some applications, the welding target may be permanently affixed in a structural environment. In other applications, the welding target may itself be movable for placement in a work fixture. Depending on the application, the guide rail arrangement may be permanently or temporarily attached to the surface of the target object (e.g., by welding, bonding, or magnetically adhering) surrounding or adjacent a target area on the surface of the welding target. In some applications, the rail or rails of the guide rail arrangement may be attached in separate pieces and joined in place along with their supports.

At S120, the weld head carriage is mounted to the guide rail arrangement. In embodiments where the welding target is immobile, this may include mounting the rail follower assembly of a portable, mobile carriage unit to the rails of the guide rail arrangement. In this scenario, the rails remain stationary along with the welding target and the relative movement of the carriage is established by actual movement of the carriage within the surrounding environment. As will be discussed in more detail below, however, there are some embodiments of the invention in which the weld head carriage is immovably attached to a work fixture and the welding target is movably supported by the work fixture. In these embodiments, the action of mounting the carriage is accomplished by positioning the welding target within the fixture so that the rail follower assembly of the carriage can be mounted to the rails. Motion of the carriage relative to the rails can then be established by the movement of the welding target and the rails within the surrounding environment while the carriage remains motionless.

At S130, the carriage is positioned at a starting position relative to the target area of the target object surface to which a weld is to be applied. At S140 motion of the carriage relative to the rail or rails of the guide rail arrangement is initiated by causing the carriage to move or by causing the weld target and the rails to move. Simultaneously with or shortly after initiation of relative movement, feedstock material from the feedstock source of the carriage is applied to the target are of the surface at S150 and the sonotrode engages the feedstock source at S160, thereby applying a welding force $F_W$ to the feedstock material and the surface of the welding target. At S170, the sonotrode is activated to conduct ultrasonic vibrations into the feedstock material and the welding target, thereby welding the feedstock material to the welding target and forming a weld layer. Once the carriage reaches the end of the target area, the sonotrode may be deactivated and disengaged, feedstock application/deposition may be halted, and movement of the carriage halted.

It is contemplated that the feedstock material used in the present invention may provide only a very thin layer that, by itself, would not form a robust weld. It is therefore an objective of the present invention to repeat the actions of the above described method to build a robust, multi-layer weld. Accordingly, the carriage may be repositioned at the starting position and actions S140, S150, S160, and S170 repeated to apply another weld layer to the target object. The actions may be repeated any number of times to build up a desired weld as in typical UAM processes. Additional machining or other processing techniques can then be applied.

In some applications (e.g., joining pipe sections), the guide rails may form a continuous circuit around a circumference of the target object. In such applications, there may be no need to halt material deposition and welding actions or to reposition the carriage for a second weld layer. Instead, the carriage may simply be allowed to continue circumferential movement around the target object, with each orbit providing a new weld layer to the target area.

Figure 7:
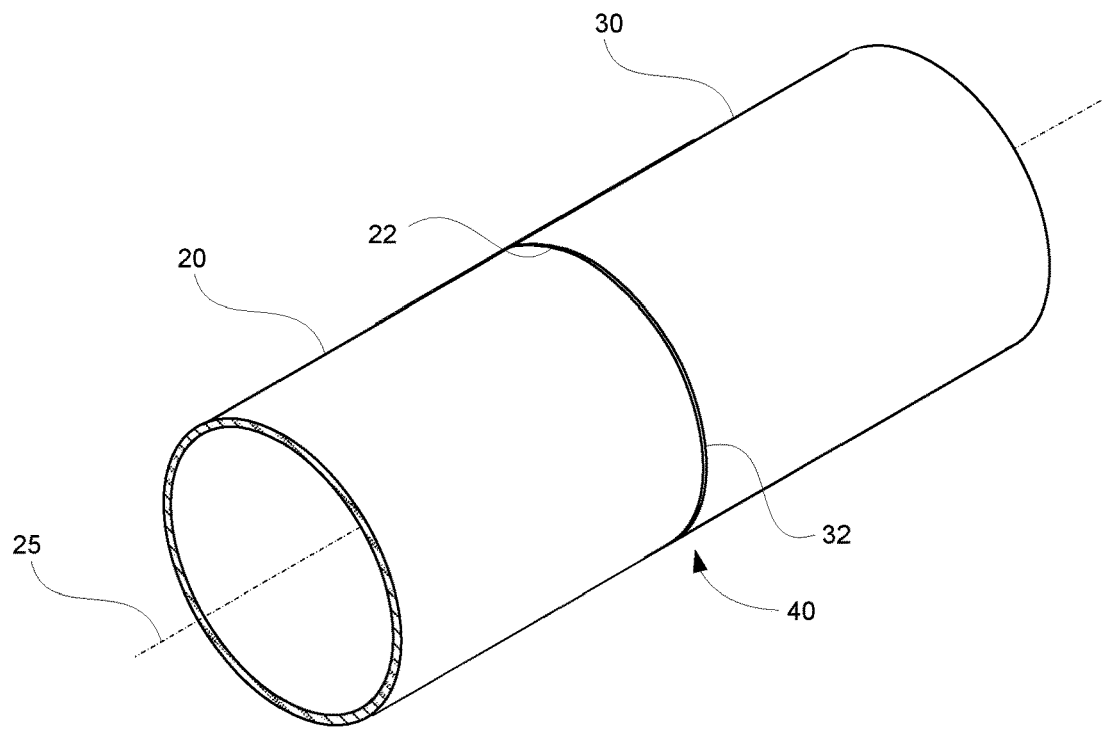
FIG. 7 is a sectioned perspective view of two pipe sections to be joined using a UAM system according to the invention.

The present invention may be of particular value in welding pipe or other cylindrical structures. FIG. 7 illustrates an exemplary scenario in which two pipe sections 20, 30 having a common longitudinal center axis 25 are to be welded together. As shown, the free end 22 of the first pipe section 20 and the free end 32 of the second pipe 30 are in contact with one another (or are closely adjacent) at a joint interface 40.

FIGS. 8-11 illustrate an orbital UAM system according to an embodiment of the invention that can be used for in-situ welding of the two pipe sections 20, 30. This system takes the form of a welding apparatus 200 that comprises a mobile material deposition and welding carriage 210 and a guide rail arrangement having a pair of parallel circumferential guide rails 231a, 231b positioned so as to surround the pipe sections 20, 30, respectively. The guide rails 231a, 231b are each supported by a plurality of rail supports 232 which may be temporarily or permanently attached to the structure to be welded. The supports 232 are mounted so that the guide rails 231a are positioned on opposite sides of the joint interface 40.

As in the previous embodiment, the material deposition and welding carriage 210 comprises a carriage housing 212 in which is disposed a weld head 220 with a sonotrode 221 and a reel or other source 252 of weldable feedstock 250. The carriage housing 212 is mounted to an undercarriage 214 configured to engage the guide rails 231a, 231b. The undercarriage 214 is further configured so that the carriage 210 is movable along the guide rails 231a, 231b in an orbital fashion around the joint interface 40. It is also configured to provide a radially outward retaining force that holds the undercarriage 212 in engagement with the guide rails 231 in response to the application of a radially inward welding force to the structure being welded. The undercarriage 214 may include wheels or bearings configured to facilitate the motion of the carriage 210 along the rails 231.

Figure 9:
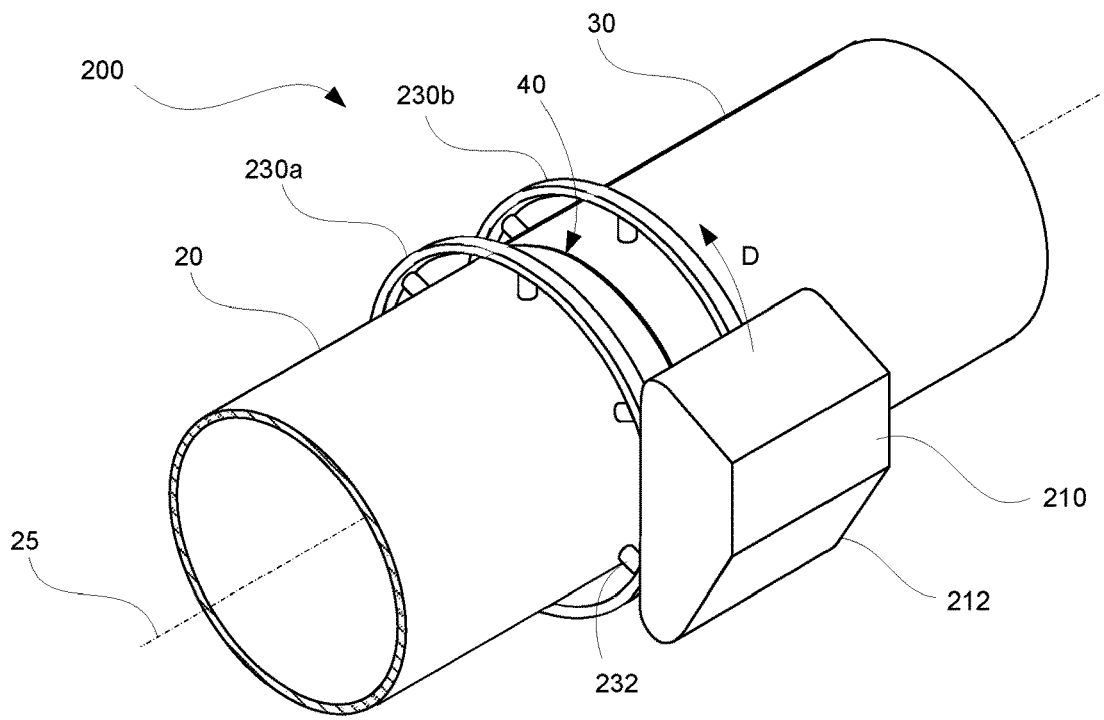
FIG. 9 is a perspective view of the pipe sections of FIG. 7 and a welding apparatus according to an embodiment of the invention.
Figure 10:
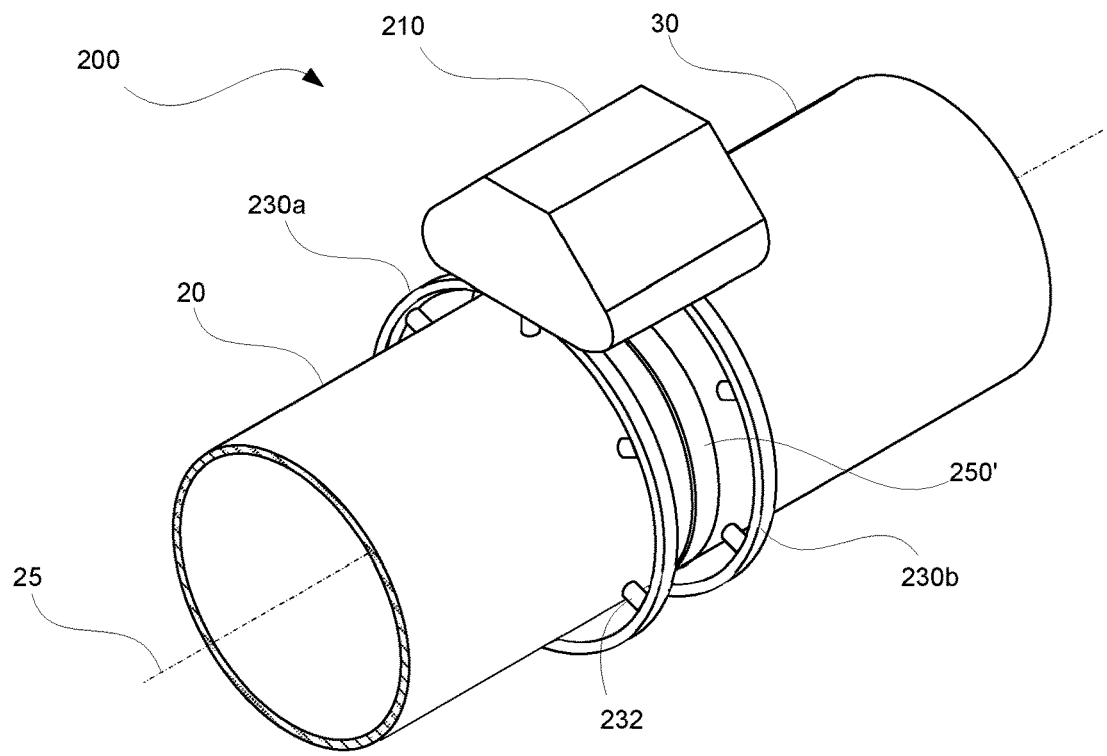
FIG. 10 is a perspective view of the pipe sections of FIG. 7 and the welding apparatus of FIG. 9.
Figure 11:
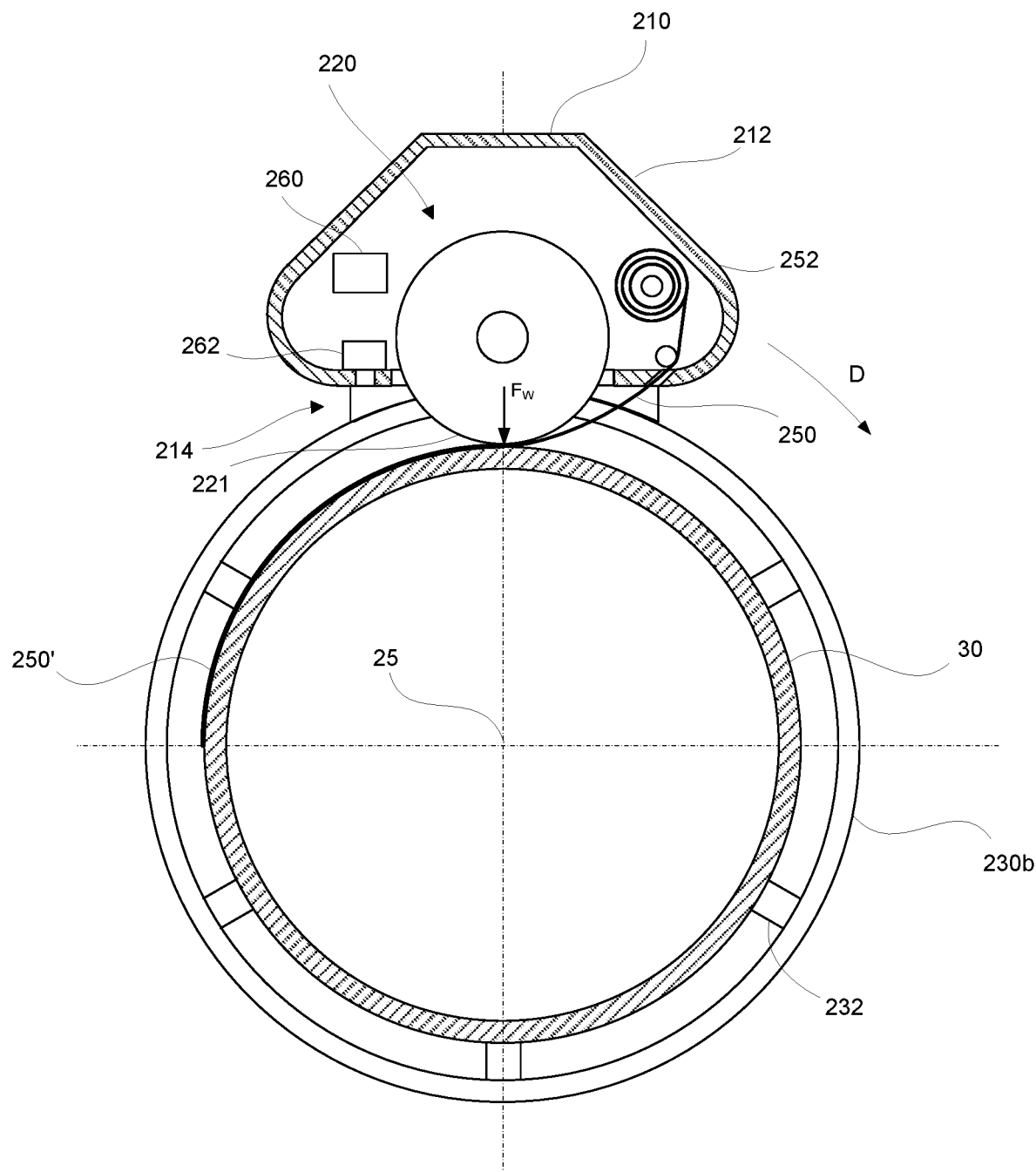
FIG. 11 is a cross-sectional view of the pipe sections of FIG. 7 and the welding apparatus of FIG. 9.
Figure 12:
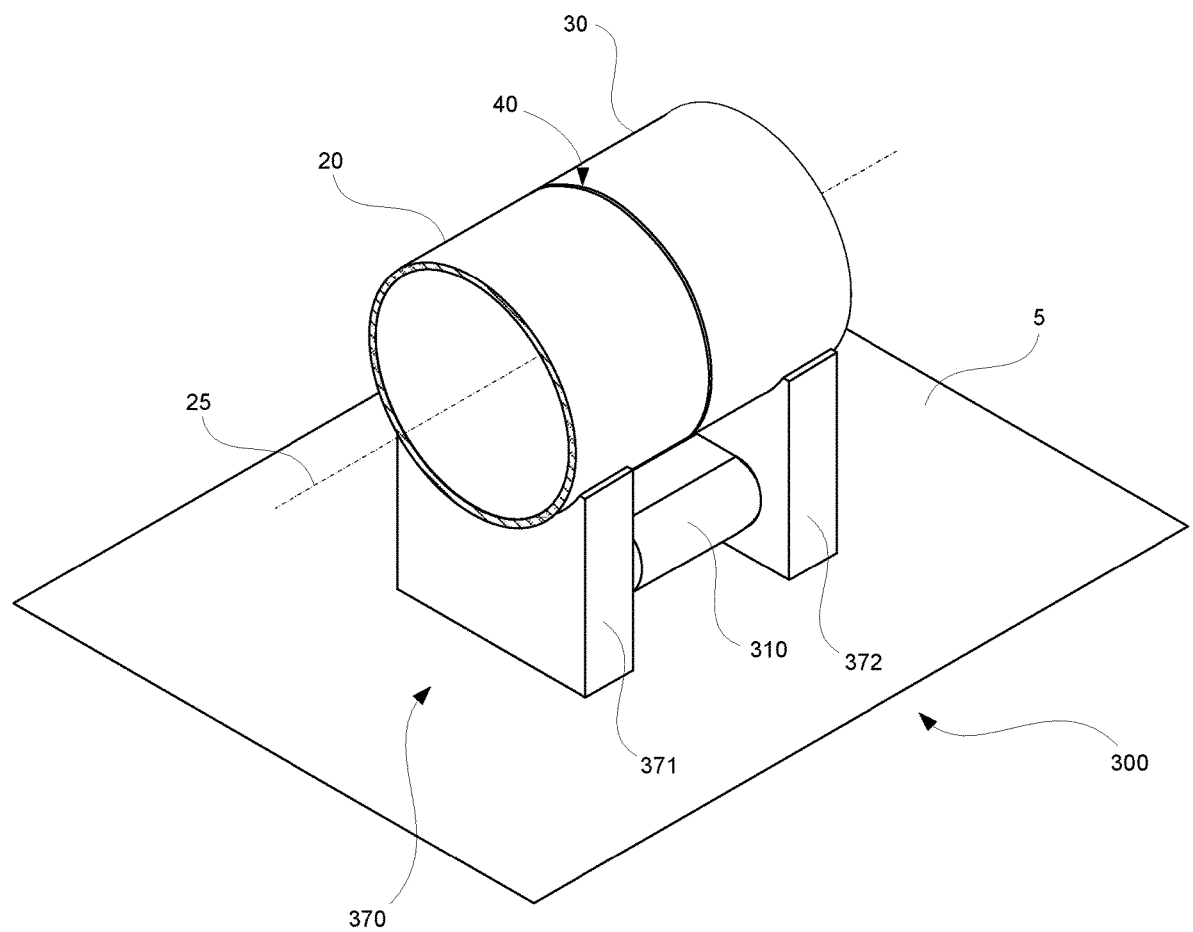
FIG. 12 is a sectioned perspective view of two pipe sections and a welding apparatus according to an embodiment of the invention.
Figure 14:
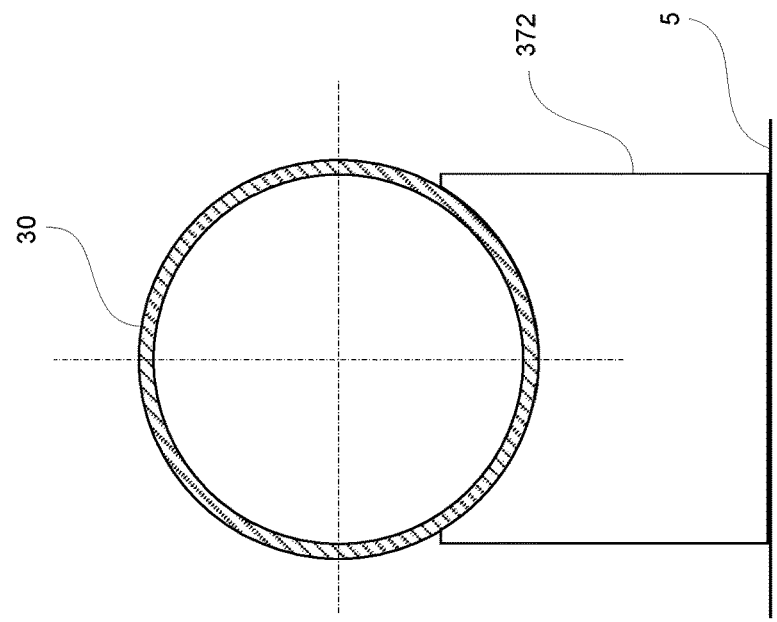
FIG. 14 is an end view of the pipe sections and welding apparatus of FIG. 12.
Figure 13:
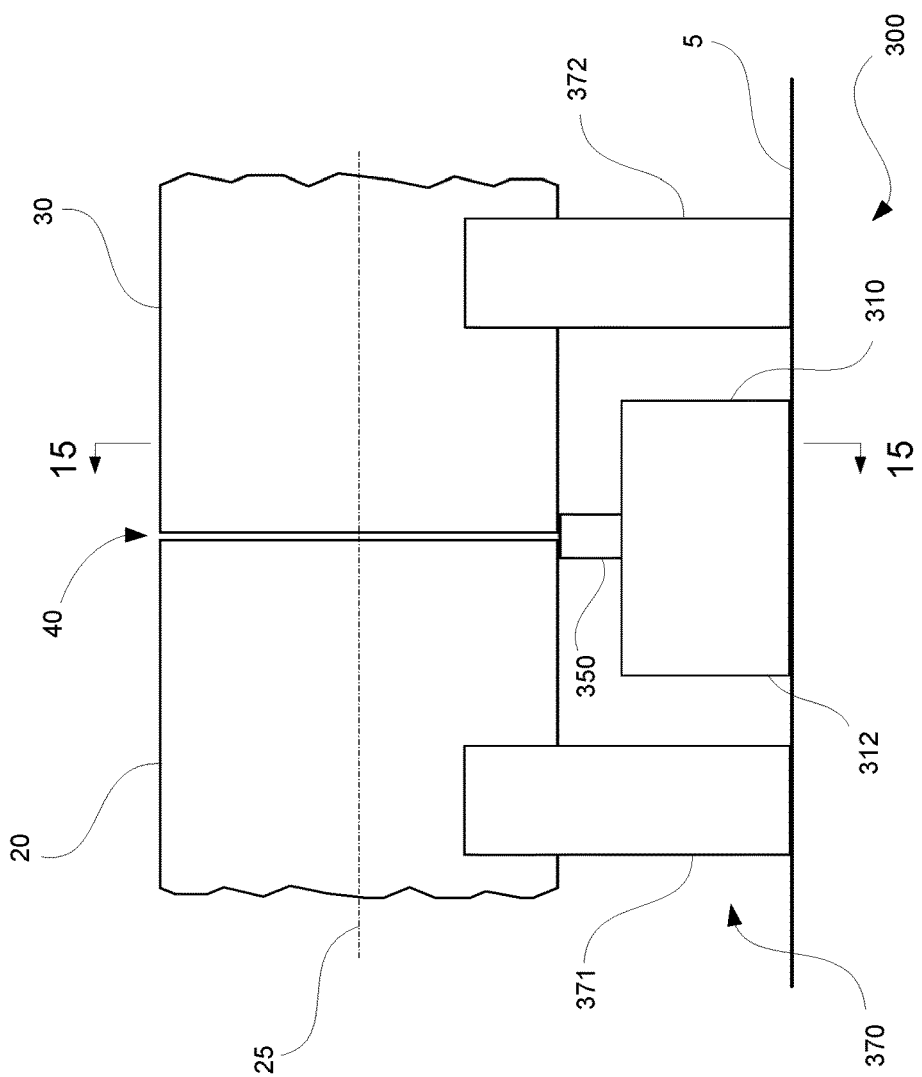
FIG. 13 is a side view of the pipe sections and welding apparatus of FIG. 12.

The carriage 210 is configured so that as the carriage 210 moves along the guide rails 231a in the orbital direction D, feedstock 250 is drawn from the feedstock source 252 to pass between the sonotrode 221 and the surface of the structure to be welded. FIG. 9 shows the carriage at an initial position and FIGS. 10 and 11 show the carriage 210 after it has moved a quarter of the way along its orbital path. The weld head 220 is mounted so as to allow application of the welding force $F_W$ to the feedstock 250 and the structure surface as the carriage 210 moves along this path. As before, internal or external electrical, mechanical or electromechanical mechanisms can be used to apply or contribute to the welding force $F_W$.

At the same time the welding force $W_F$ is being applied to the feedstock 250, the sonotrode transducer 222 is energized to produce high frequency vibration to weld the feedstock 250 to the structure (in this case, to the surfaces of the two pipe sections 20, 30). In the illustrated example, the welded feedstock layer 250' bridges the joint line 40 and serves as a first layer of a UT weld to permanently join the two pipe sections 20, 30. Upon completion of one orbit, the carriage 210 will have applied a complete first layer of welded feedstock 250'. The carriage 210 may simply continue to travel its orbital path to begin forming a second layer of welded feedstock 250'. The process may be repeated as many times as necessary to produce a desired weld without removal or shifting of the carriage 210.

It will be understood that in the case of repairs, a complete circumferential weld layer may not be required. In such cases, the material deposition and welding carriage 210 may be commanded to deposit and sonically weld a feedstock layer at only a portion of the carriage orbit. Upon completion of deposition/welding of a layer over the target area, the carriage 210 could continue around its orbit until reaching the target area again, whereupon a second layer could be initiated over the target area, and so on until a desired weld is achieved.

In some applications, it may be desirable to produce an over-lapping weld to enlarge the joining area along or adjacent the joint line 40. In such applications, the guide rails 231a, 231b could be shifted after formation of an initial circumferential weld, and the process repeated to produce a second weld over-lapping the first.

As in the previous embodiment, the material deposition and welding carriage 210 may also comprise an on-board data processor 260 in communication with the sonotrode transducer 222 and feedstock dispensing mechanism. The processor 260 may also be in communication with external processors or user input devices. In some embodiments, this may be by wireless connection via a network. The processor 260 may also be in communication with an internal or external power source connected to the sonotrode transducer 222. The apparatus 222 may also include a sensor package 262 mounted to the carriage housing 212. The sensor package 262 may be in communication with the data processor 260 and could include, for example, optical, laser, thermal or other sensors configured and positioned to capture data on the applied feedstock 250'. The captured data may be analyzed to assess the integrity of the welded layer 250'.

In some in-the-field applications, pipe repair or joinder operations may involve pipe sections that are movable to some degree. In such applications, it may be desirable to have a welding apparatus that remains fixed during welding operation. FIGS. 12-16 illustrate an exemplary scenario in which the welding target consists of two pipe sections 20, 30 similar to those used to illustrate the previous embodiment. In this case, however, the pipe sections 20, 30 are not fixed in place.

In this scenario, the pipe sections 20, 30 may be joined using an orbital UAM system according to another embodiment of the invention. This system takes the form of a welding apparatus 300 having a cradle-like support fixture 370 comprising two or more supports 371, 372 supported by a floor or other support surface 5 and configured to receive and rotatably support the pipe sections 20, 30 for joinder thereof. The fixture 370 may also be used to receive a single pipe section for conducting a circumferential welding operation thereon. The support fixture 370 may further comprise a mechanism for selectively rotating the pipe sections 20, 30 (or the single pipe section) during a welding operation.

The welding apparatus 300 also comprises a material deposition and welding carriage 310 comprising a housing 312 in which is disposed a weld head 320 with a sonotrode 321 and a reel or other source 352 of weldable feedstock 350. In the illustrated embodiment, the housing 312 is fixed to and supported by the support surface 5 and positioned between the supports 371, 372. This positioning allows the material deposition and welding carriage 310 to remain in place as pipe sections are rotatably placed in the support fixture 370. It will be understood, however, that the carriage 310 may alternatively be configured for positioning after the pipe sections 20, 30 are in place. In a particular example, the carriage 310 may be configured to be positioned on top of the pipe section(s) and to be held in place by an additional structure (not shown).

Figure 8:
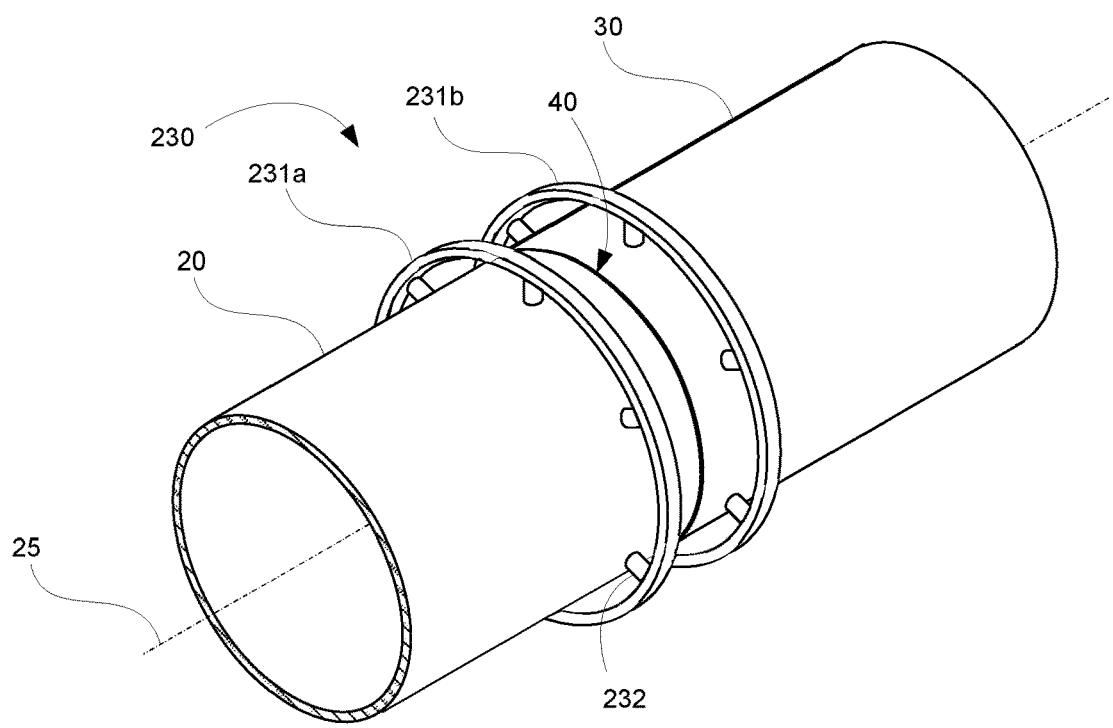
FIG. 8 is a perspective view of the pipe sections of FIG. 7 and the guide rails of a welding apparatus according to an embodiment of the invention.

In some embodiments, the welding apparatus 300 may include a guide rail arrangement similar to the arrangement 230 shown in FIG. 8. In such embodiments, the welding carriage 310 may be configured with an undercarriage similar to that of the previous embodiments so that the carriage 310 "follows" along the guide rails as the weld target is rotated in the fixture 370.

Figure 16:
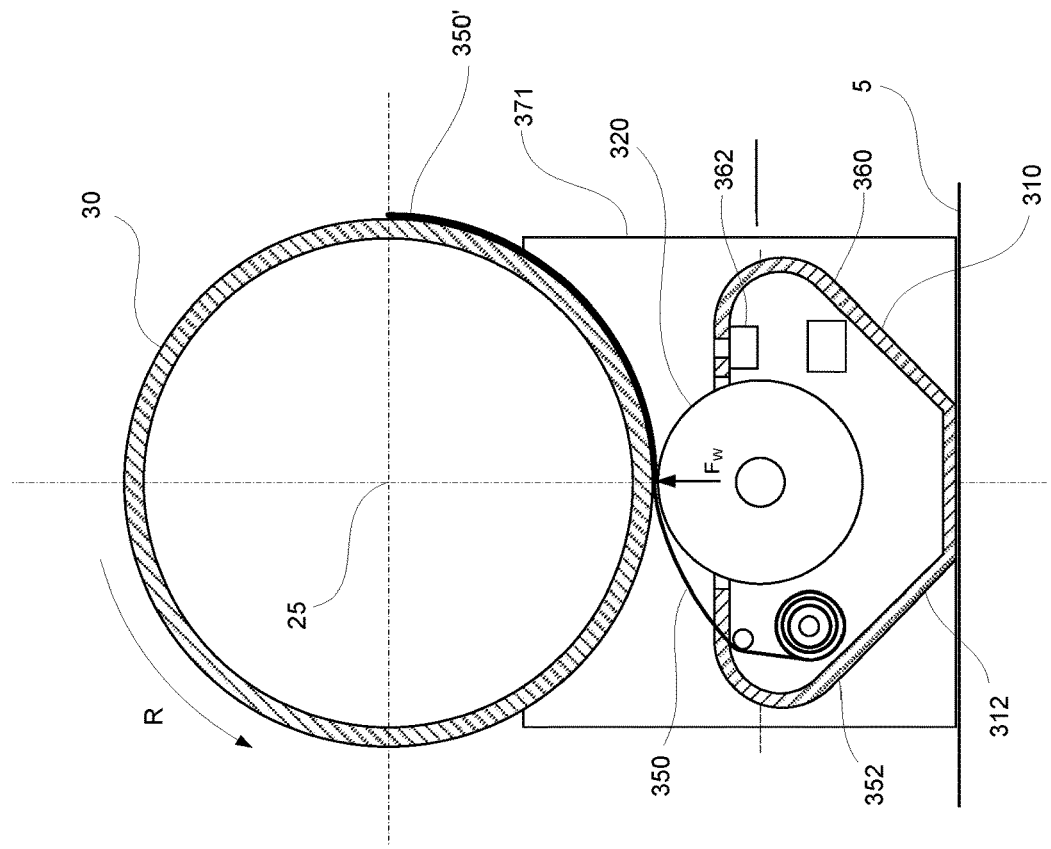
FIG. 16 is a sectioned view of the pipe sections and welding apparatus of FIG. 12.
Figure 15:
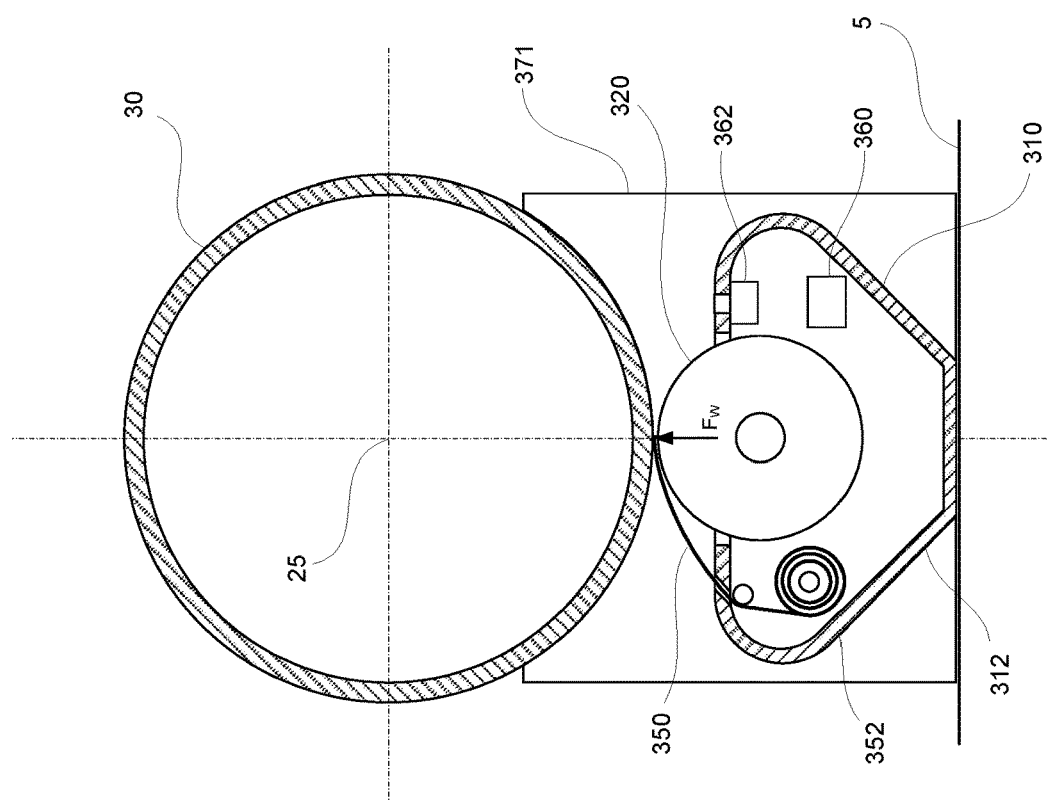
FIG. 15 is a sectioned view of the pipe sections and welding apparatus of FIG. 12.
Figure 19:
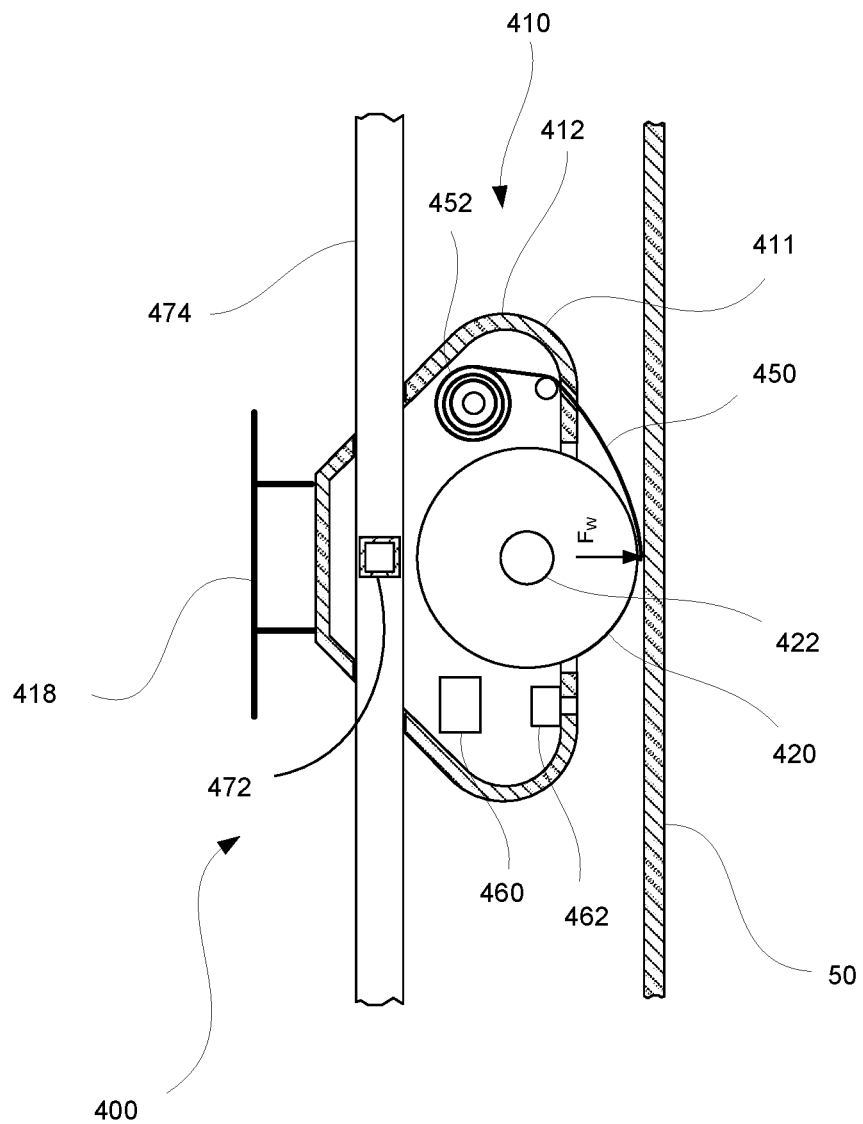
FIG. 19 is a section view of a portion of the welding apparatus of FIG. 17.

The carriage 310 is configured so that the housing 312 and the weld head 320 remain fixed while the pipe sections 20, 30 are rotated. This produces a relative motion between the sonotrode 321 and the interface 40 that is substantially the same as in the previously described orbital embodiment. As the pipe sections 20, 30 rotate in rotation direction R, feedstock 350 is drawn from the feedstock source 352 to pass between the sonotrode 321 and the surfaces of the pipe sections 20, 30. FIG. 15 shows the pipe sections 20, 30 at an initial position and FIG. 16 shows the pipe sections 20, 30 after they have made a quarter of one rotation in direction R. The weld head 320 is mounted so as to allow application of the welding force $F_W$ to the feedstock 350 and the structure surface during rotation of the pipe sections 20, 30 (or a single pipe section). As before, internal or external electrical, mechanical or electromechanical mechanisms can be used to apply or contribute to the welding force $F_W$. In the illustrated embodiment, the weight of the pipe section(s) may contribute to the to the welding force $F_W$.

At the same time the welding force $W_F$ is being applied to the feedstock 350, the sonotrode transducer 322 is energized to produce high frequency vibration to weld the feedstock 350 to the structure (in this case, to the surfaces of the two pipe sections 20, 30). In the illustrated example, the welded feedstock layer 350' bridges the joint line 40 and serves as a first layer of a UT weld to permanently join the two pipe sections 20, 30. Upon completion of one rotation, the carriage 310 will have applied a complete first layer of welded feedstock 350'. The pipe sections 20, 30 may simply continue their rotation to begin forming a second layer of welded feedstock 350'. The process may be repeated as many times as necessary to produce a desired weld without removal or shifting of the carriage 310 or the pipe sections 20, 30.

If a complete circumferential weld layer is not required, the material deposition and welding carriage 310 may be commanded to deposit and sonically weld a feedstock layer during only a portion of a rotation of a pipe section to target a particular circumferential area. Upon completion of deposition/welding of a layer over the target area, the rotation of the pipe section could be continued until the target area is again presented to the material deposition and welding carriage 310, whereupon a second layer could be initiated over the target area, and so on until a desired weld is achieved.

In some applications, it may be desirable to produce an over-lapping weld to enlarge the joining area along or adjacent the joint line 40. In such applications, the pipe sections could be axially shifted after formation of an initial circumferential weld, and the process repeated to produce a second weld over-lapping the first.

As in the previous embodiment, the material deposition and welding carriage 310 may also comprise an on-board data processor 360 in communication with the sonotrode transducer 322 and feedstock dispensing mechanism. The processor 360 may also be in communication with external processors or user input devices. In some embodiments, this may be by wireless connection via a network. The processor 360 may also be in communication with an internal or external power source connected to the sonotrode transducer 322. The apparatus 322 may also include a sensor package 362 mounted to the carriage housing 312. The sensor package 362 may be in communication with the data processor 360 and could include, for example, optical, laser, thermal or other sensors configured and positioned to capture data on the applied feedstock 350'. The captured data may be analyzed to assess the integrity of the welded layer 350'.

Aspects of the present invention can also be applied in planar repair or manufacturing processes. In an illustrative scenario shown in FIGS. 17-22, a thin plate 60 must be welded to a large vertically oriented wall or base plate 50 along an interface line 40. For this application, a portable welding apparatus 400 according to an embodiment of the invention may be used for in-situ welding. As schematically illustrated in FIGS. 17-22, the welding apparatus 400 comprises a material deposition and welding carriage 410 attached to and supported by a planar motion fixture 470. The fixture 470 is similar in concept and operation to an xy-plotter in that it allows controlled two dimensional movement of the carriage 410 parallel to a planar surface to which the fixture 470 is attached.

The fixture 470 comprises a rectangular outer frame 471 with two horizontal guide rails 478 and two vertical guide rails 479 and a support 477 at each corner. The supports 477 are configured for removable attachment to the planar wall 50. The supports may be attached using any mechanism sufficient to counter the forces applied to the wall 50 during a welding operation. Suitable mechanisms may include, without limitation, tack welding, reversible chemical or thermal bonding, hydraulics, mechanical fasteners (e.g., screws, bolts, clamps, etc.), and magnets. The fixture 470 further comprises a horizontal (x axis) beam 472 a movably mounted to the vertical guide rails 479 and a vertical (y axis) beam 474 movably mounted to the guide horizontal guide rails 478. The attachments of the beams 472, 474 to the guide rails 478, 479 are configured so that the beams can be moved in directions orthogonal to their respective longitudinal axes 473, 475.

The material deposition and welding carriage 410 is similar to those of the previously described embodiments. In this case, the carriage 410 of the material deposition and welding carriage 410 comprises a carriage housing 412 slidably mounted to both the horizontal beam 472 and the vertical beam 474 so that the carriage 410 moves when the beams 472, 474 are moved along the guide rails 478, 479. One or more handles 418 may be attached to the carriage housing to facilitate manual movement of the carriage 410. In some embodiments, movement of the carriage may be accomplished by motorized movement of the beams 472, 474 along the guide rails 478, 479.

A sonotrode 420 and a reel or other source 452 of weldable feedstock 450 are disposed within the carriage housing 412. The carriage 410 is configured so that when the fixture 470 is mounted to the wall 50, the sonotrode 420 may be placed in contact with the surface of the wall 50 so that is slides along the surface as the carriage 410 is moved along the horizontal and/or vertical beams 472, 474. In the simple illustrated embodiment, the carriage 410 is mounted so that the feedstock 450 can be laid along a line parallel to the vertical beam 474. It will be understood that the apparatus can be mounted so as to lay and weld feedstock a long a line parallel to the horizontal beam 472 as well. In some embodiments, the carriage 410 may be configured to be rotatable so that remounting is not necessary. It will be understood that in some embodiments, the fixture 470 and the carriage 410 may be configured so that feedstock can be laid and welded along any two dimensional path. Regardless of its path, as the carriage 410 moves in a forward direction D, feedstock 450 may be selectively drawn from the feedstock source 452 to pass between the sonotrode 420 and the surface of the structure(s) to be welded.

It will be understood that in some embodiments or applications, movement of the carriage 410 is accomplished manually. In other embodiments, the motion of the carriage 410 may be accomplished through motor control, which may, in turn, be either automated or manually controlled.

As in the previous embodiment, the material deposition and welding carriage 410 may comprise an on-board data processor 460 in communication with the sonotrode transducer 422 and feedstock dispensing mechanism. The processor 460 may also be in communication with external processors or user input devices. In some embodiments, this may be by wireless connection via a network. The processor 460 may also be in communication with an internal or external power source connected to the sonotrode transducer 422. The apparatus 422 may also include a sensor package 462 mounted to the carriage housing 412. The sensor package 462 may be in communication with the data processor 460 and could include, for example, optical, laser, thermal or other sensors configured and positioned to capture data on the applied feedstock 450'. The captured data may be analyzed to assess the integrity of the welded layer 450'.

Figure 20:
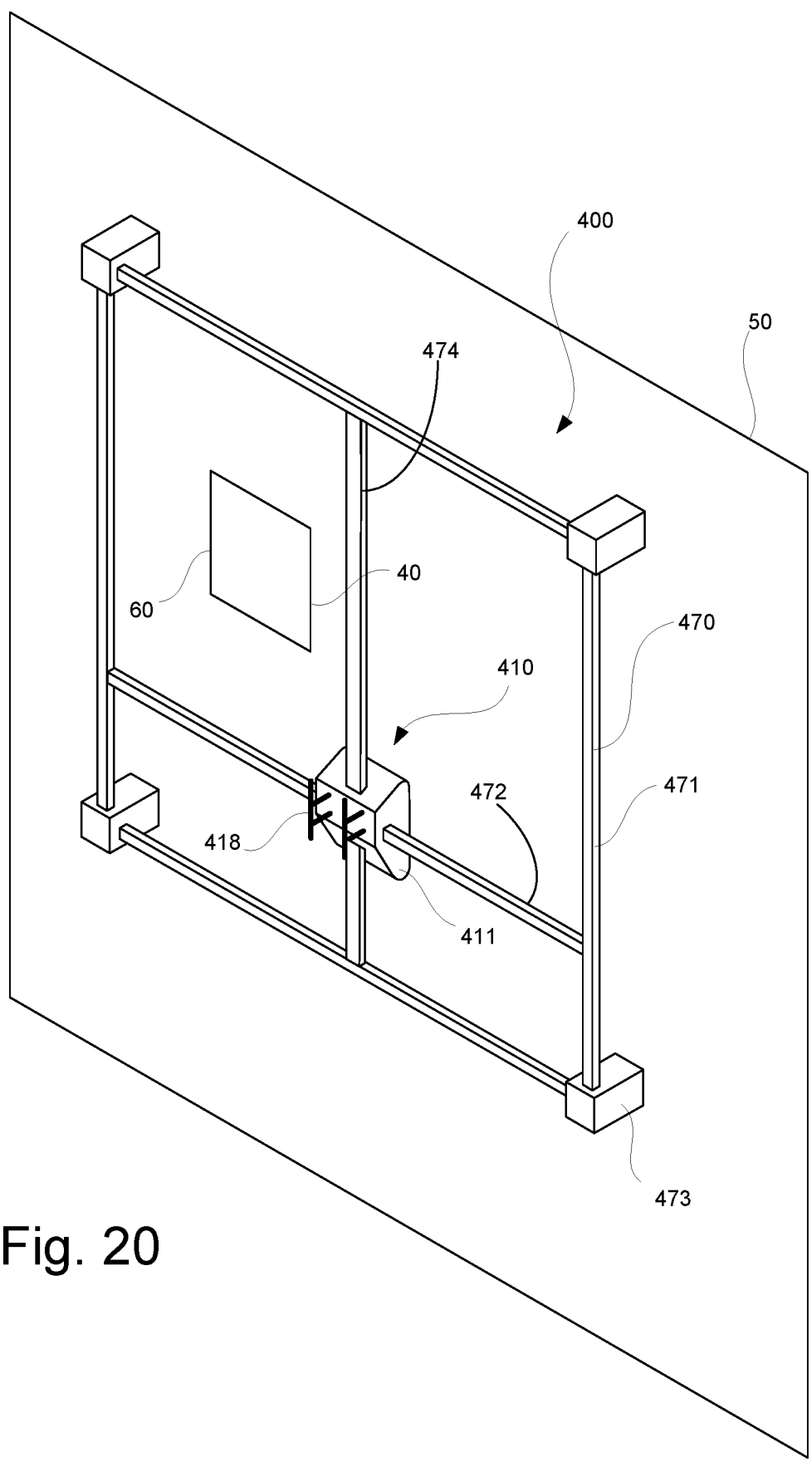
FIGS. 20-22 are perspective views illustrating a sequence of operation of the welding apparatus of FIG. 17.
Figure 21:
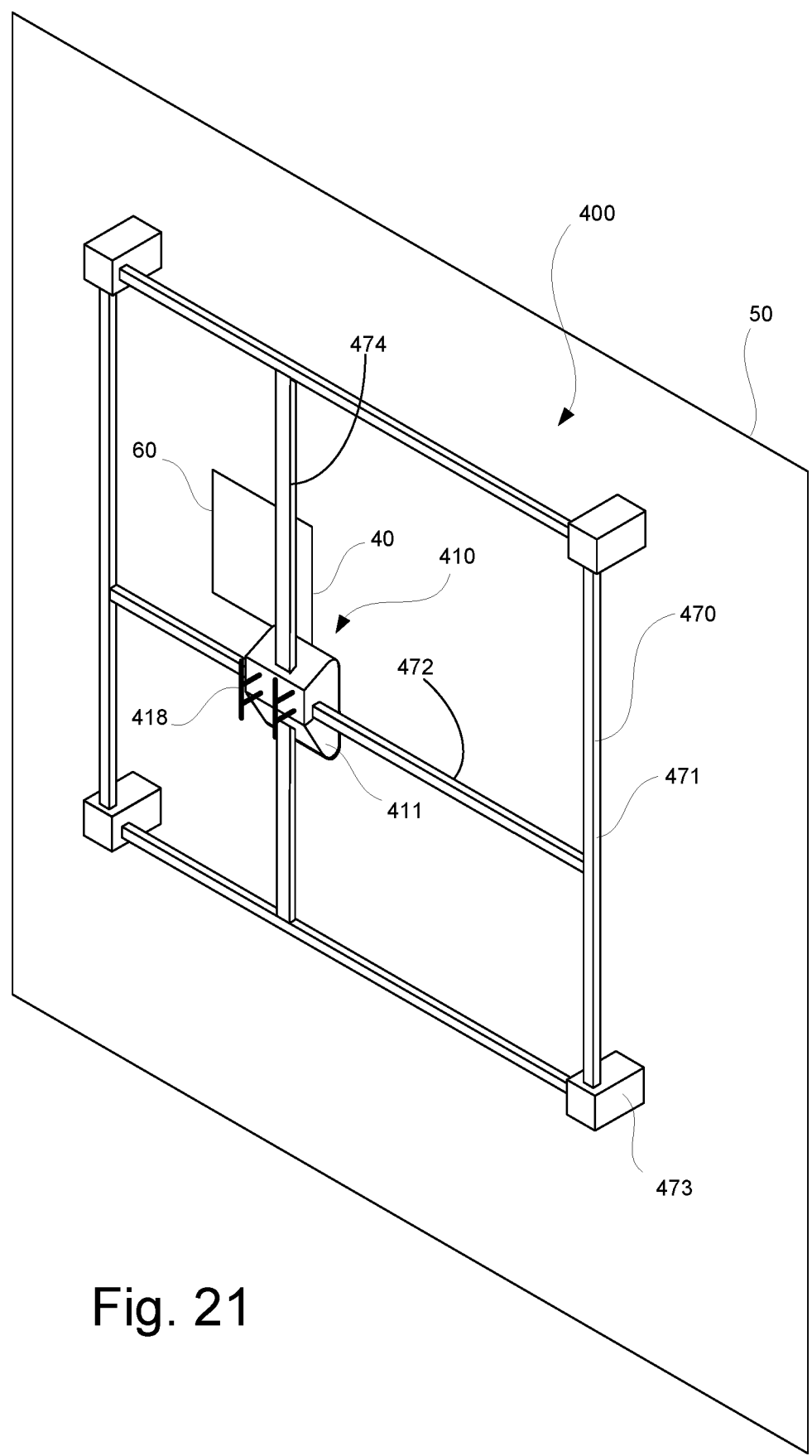
Figure 22:
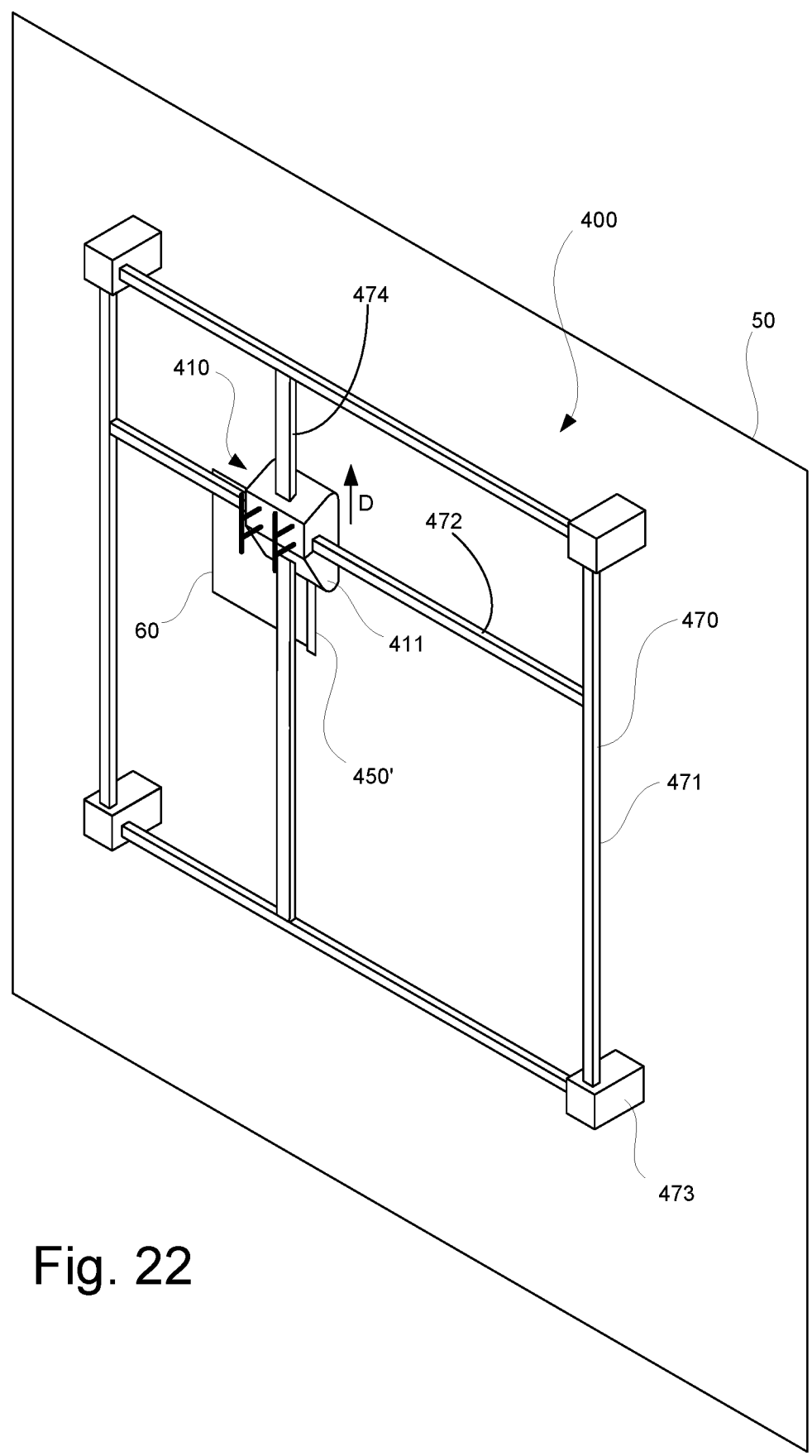

FIGS. 20-22 illustrate a sequence of operation for the welding apparatus 400. In FIG. 20, the guide rails 478, 479 of the frame 470 are mounted to the wall 50 so that the interface 40 to be welded is within the outer frame 470. The carriage 410 and beams 472, 474 are mounted to the guide rails 478, 479. As shown in FIG. 20, the carriage 410 may initially be positioned away from the target area. FIG. 21 shows the carriage 410 after movement in the horizontal and vertical directions to a position at one end of the interface 40 where welding is to be initiated. FIG. 22 shows the carriage 410 in a position partway along the interface 40, a layer of welded feedstock 450' having been disposed over and welded to the plate 60 and the wall 50 on both sides of the traveled portion of the interface 40.

Upon completion of its path along the interface 40, the carriage 410 will have applied a complete first layer of welded feedstock 450'. The carriage 410 may then be returned to the position shown in FIG. 20 and the feedstock deposition and welding action repeated for another layer of feedstock 450' following the same carriage path. The process may be repeated as many times as necessary to produce a desired weld.

In some applications, it may be desirable to produce an over-lapping weld to enlarge the weld area. In such applications, after formation of an initial weld along a first carriage path, a second weld over-lapping the first may be formed by passing the carriage along a second path shifted slightly from the first.

In any of the foregoing embodiments, the material deposition and welding apparatus may include hardware for conducting a machining operation (i.e., a material removal or shaping action). In particular, CNC machining may be used prior to performing the deposition/welding operation (e.g., surface preparation) or following the deposition/welding operation (e.g., to remove material added via the process).

In the methods of the invention, the UT sonotrode frequency, speed, and force are parameters that may be controlled by either user input or feedback from a closed loop control system. An open-looped control system could also be utilized but may require additional manual operations to apply forces locally via mechanical means. Control parameters may be pre-programmed or changed during the deposition by closed loop control based on in situ measurements obtained from an array of sensors.

This system and method can integrate laser scanning in-situ for dimensional monitoring or deposition quality. In this proposed variant in-situ scanning could be used to scan the material in question as part of manual or closed loop controls to inform the deposition process and manually or automatically adjust the deposition of material. It is also understood that a system of integrated or individual sensors may be used for the deposition of the material using one or more of the following measurements:

1. Thermal measurement can be performed on the base material and applied material via thermal imaging or temperature readings for quality control.
2. Measurement of acoustic or other ultrasonic readings to enable the devices monitoring.
3. Visual dimensional measurements can be made to manually or automatically to adjust the application and may use a plurality of cameras, imaging hardware/software, infrared, or other suitable optical measurements for determining material position for both the base material and feedstock.
4. Integrated use of magneto-induction complex impedance analysis, eddy current, acoustic measurement, and/or other electro-magnetic properties may be integrated into this system to inspect, measure, or otherwise provide objective quality evidence of the material before, during, or after fabrication.
5. Part scanning for fabrication, path planning, and post inspection are considered integral variants of this method.

Application of the device can be performed manually or automatically with path planning or similar software for the automatic fabrication or repair of material or components. Path planning may be modified in-situ based on readings from one or more sensors monitoring the material deposition.

The systems and methods of the invention have many applications, including, but not limited to, the following: joining of materials, pipe, repair of pipe or pipe joints, repair of flat surfaces (e.g., bulkheads), and cladding of pre-shaped feedstock to flat surface or pipe. However, it should be understood that this method is not constrained to just those examples. Essentially any material (or even dissimilar metals) may be joined methods of the invention. If a UT bond can be made between the feedstock and the base structure/material, then it expected that this system and method can be applied.

It will be understood that the above method may incorporate diagnostic operations to assess the condition/characteristics of a weld after application of a weld layer. Information from these diagnostic operation may be used to make adjustments to the welding apparatus or operation.

It will be understood that the methods of the invention may be used in conjunction with any form of UT weld process using any suitable material. Further, it will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:
1. A welding apparatus comprising:
   a guide rail arrangement attachable to a welding target, the arrangement including at least one guide rail having an upper surface and a lower surface, and
   a plurality of guide rail supports, each guide rail support being removably attachable to a surface of the welding target and being attached to the at least one guide rail for maintaining each of the at least one guide rail at a uniform distance from the surface of the welding target;

a carriage comprising a carriage housing and a rail follower assembly attached to the carriage housing and being movably mountable to the at least one guide rail for relative movement there-along with the rail follower assembly in engagement with both the upper and lower rail surfaces of each of the at least one guide rail;

a feedstock source disposed within the carriage housing and configured to selectively deposit a feedstock material on a target surface of the welding target when the welding apparatus is in a welding configuration in which the rail follower assembly is attached to the at least one guide rail and the guide rail arrangement is attached to the welding target; and an ultrasonic weld head partially disposed within the carriage housing and having a sonotrode extending toward the target surface when the welding apparatus is in the welding configuration so as to engage the deposited feedstock material and apply a normal welding force to the deposited feedstock material and the target surface, the sonotrode being operable to conduct ultrasonic vibrations into the deposited feedstock material and the target surface to weld the feedstock material to the target surface.

2. A welding apparatus according to claim 1 wherein the guide rail supports are weldable to the surface of the welding target.

3. A welding apparatus according to claim 1 wherein
when the guide rail arrangement is attached to the welding target, each of the at least one guide rail is parallel to a desired travel line, and
the rail follower assembly comprises an undercarriage movably mountable to the at least one guide rail so as to be constrained to relative motion along the desired travel line.

4. A welding apparatus according to claim 1 wherein each of the at least one guide rail comprises a plurality of rail segments formable into a continuous circumferential ring when the guide rail arrangement is attached to a cylindrical welding target.

5. A welding apparatus according to claim 4 wherein when the welding apparatus is in the welding configuration, the carriage is movable along the circumferential ring to apply and weld the feedstock material along a circumference of the cylindrical welding target.

6. A welding apparatus according to claim 4 further comprising:
a support fixture having a cradle for receiving and rotatably supporting the cylindrical welding target,
wherein the carriage is fixedly attached to the support fixture so that, when the welding apparatus is in the welding configuration, rotation of the cylindrical welding target allows the carriage to deposit and weld the feedstock material along a circumference of the cylindrical welding target.

7. A welding apparatus according to claim 3 wherein
the at least one guide rail comprises first and second parallel guide rails, and
the undercarriage and the carriage housing are arranged so that the sonotrode engages the deposited feedstock material between the first and second guide rails.

8. A welding apparatus according to claim 1 further comprising:
a welding force enhancement mechanism operatively connected to the weld head and rail follower assembly and configured to selectively increase the normal welding force.

9. A welding apparatus according to claim 1 wherein
the sonotrode is aligned so as to conduct ultrasonic vibrations along a Z-axis,
the at least one guide rail comprises spaced apart first and second X-guide rails parallel to
an X-axis orthogonal to the Z-axis and spaced apart first and second Y guide rails
parallel to a Y-axis orthogonal to the X-axis and the Z-axis, the two X: guide rails
being connected to the two Y-axis guide rails to form a rectangular guide rail frame,
the rail follower assembly comprises
a first slide beam having a first end movably attachable to the first X-guide rail for movement there-along and a second end movably attachable to the second X-guide rail for movement there-along, and
a second slide beam having a first end movably attachable to the first Y-guide rail for movement there-along and a second end movably attachable to the second Y-guide rail for movement there-along, and
the carriage housing comprises
a first slide receiver through which the first slide beam is slidably disposed, and
a second slide receiver through which the second slide beam is slidably disposed.

10. A welding apparatus according to claim 9 wherein one of the guide rail supports is attached to the rectangular guide rail frame at each corner of the rectangular guide rail frame.

11. A welding apparatus according to claim 9 further comprising:
a first movement control mechanism operatively connected to the rail follower assembly and configured to selectively move the carriage parallel to the first and second X-guide rails; and
a second movement control mechanism operatively connected to the rail follower assembly and configured to selectively move the carriage parallel to the first and second Y-guide rails.

12. A welding apparatus according to claim 11 further comprising:
a movement control processor in communication with the first and second movement control mechanisms for transmitting movement instructions thereto.

13. A welding apparatus according to claim 12 wherein the movement control processor is configurable to provide a sequence of instructions to the first and second movement control mechanisms configured to cause the movement of the carriage along a predetermined two-dimensional path.

14. A welding apparatus according to claim 1 wherein the feedstock material is a metal tape and the feedstock source is a reel from which the metal tape is selectively drawable for application to the target surface when the apparatus is in the welding configuration.

15. A welding apparatus comprising:
a guide rail arrangement attachable to a welding target, the arrangement including at least one guide rail having an upper surface and a lower surface, and
a plurality of guide rail supports, each guide rail support being attachable to a surface of the welding target and being attached to the at least one guide rail for maintaining each of the at least one guide rail at a uniform distance from the surface of the welding target;

a carriage comprising a carriage housing and a rail follower assembly attached to the carriage housing and being movably mountable to the at least one guide rail for relative movement there-along with the rail follower assembly in engagement with both the upper and lower rail surfaces of each of the at least one guide rail;

a feedstock source disposed within the carriage housing and configured to selectively deposit a feedstock material on a target surface of the welding target when the welding apparatus is in a welding configuration in which the rail follower assembly is attached to the at least one guide rail and the guide rail arrangement is attached to the welding target; and an ultrasonic weld head partially disposed within the carriage housing and having a sonotrode extending toward the target surface when the welding apparatus is in the welding configuration so as to engage the deposited feedstock material and apply a normal welding force to the deposited feedstock material and the target surface, the sonotrode being operable to conduct ultrasonic vibrations into the deposited feedstock material and the target surface to weld the feedstock material to the target surface wherein the at least one guide rail comprises first and second parallel guide rails, wherein when the guide rail arrangement is attached to the welding target, the first and second parallel guide rails are parallel to a desired travel line, wherein the rail follower assembly comprises an undercarriage movably mountable to the at least one guide rail so as to be constrained to relative motion along the desired travel line, and the undercarriage and the carriage housing are arranged so that the sonotrode engages the deposited feedstock material between the first and second guide rails.

16. A welding apparatus according to claim 15 wherein the guide rail supports are removably attachable to the surface of the welding target.

17. A welding apparatus according to claim 15 wherein the guide rail supports are weldable to the surface of the welding target.

18. A welding apparatus according to claim 15 wherein each of the at least one guide rail comprises a plurality of rail segments formable into a continuous circumferential ring when the guide rail arrangement is attached to a cylindrical welding target.

19. A welding apparatus according to claim 18 further comprising:

a support fixture having a cradle for receiving and rotatably supporting the cylindrical welding target, wherein the carriage is fixedly attached to the support fixture so that, when the welding apparatus is in the welding configuration, rotation of the cylindrical welding target allows the carriage to deposit and weld the feedstock material along a circumference of the cylindrical welding target.

20. A welding apparatus according to claim 15 further comprising:

a welding force enhancement mechanism operatively connected to the weld head and rail follower assembly and configured to selectively increase the normal welding force.

* * * * *

UNITED STATES PATENT AND TRADEMARK OFFICE
CERTIFICATE OF CORRECTION

PATENT NO. : 11,224,935 B2  
APPLICATION NO. : 16/421727  
DATED : January 18, 2022  
INVENTOR(S) : Ralls et al.

Page 1 of 1

It is certified that error appears in the above-identified patent and that said Letters Patent is hereby corrected as shown below:

In the Claims

In Claim 9, Column 14, Line 15, "Z-axis, the two X: guide rails" should read --Z-axis, the two X-guide rails--.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*